US011991787B2

(12) United States Patent
Kalavakuru et al.

(10) Patent No.: US 11,991,787 B2
(45) Date of Patent: May 21, 2024

(54) DYNAMIC ACCESS POINT RADIO FREQUENCY POWER CONTROL FOR POWER OVER ETHERNET ADAPTATION

(71) Applicant: CISCO TECHNOLOGY, INC., San Jose, CA (US)

(72) Inventors: Sivadeep R. Kalavakuru, Copley, OH (US); Fred Jay Anderson, Lakeville, OH (US); Xiangxiang Fang, Campbell, CA (US); Robert S. Snider, Broadview Heights, OH (US); John Martin Blosco, Norton, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 890 days.

(21) Appl. No.: 17/027,597

(22) Filed: Sep. 21, 2020

(65) Prior Publication Data

US 2022/0094072 A1 Mar. 24, 2022

(51) Int. Cl.
*H04L 12/10* (2006.01)
*H04B 1/04* (2006.01)
*H04L 12/40* (2006.01)
*H04W 88/08* (2009.01)

(52) U.S. Cl.
CPC ........ *H04W 88/085* (2013.01); *H04B 1/0458* (2013.01); *H04L 12/10* (2013.01); *H04L 12/40045* (2013.01)

(58) Field of Classification Search
CPC . H04B 1/0458; H04L 12/10; H04L 12/40045; H04W 84/12; H04W 88/08; H04W 88/085; Y02D 30/70
See application file for complete search history.

(56) References Cited

U.S. PATENT DOCUMENTS

| 2010/0031066 A1 | 2/2010 | Geiger | |
|---|---|---|---|
| 2013/0227313 A1 | 8/2013 | Vorenkamp | |
| 2016/0363980 A1* | 12/2016 | Spiel | H04L 12/10 |
| 2017/0220101 A1 | 8/2017 | Brooks | |
| 2018/0150127 A1* | 5/2018 | Wendt | G06F 1/3206 |
| 2022/0021406 A1* | 1/2022 | Trautmann | H03F 1/3247 |
| 2022/0022174 A1* | 1/2022 | Xue | H04L 5/0087 |
| 2022/0069725 A1* | 3/2022 | Lee | H02M 1/008 |
| 2023/0025862 A1* | 1/2023 | He | H04L 1/0003 |

FOREIGN PATENT DOCUMENTS

| CN | 103944739 A | 7/2014 | |
|---|---|---|---|
| CN | 210183344 U | 3/2020 | |
| WO | WO-2019197027 A1 * | 10/2019 | H04L 1/0003 |

* cited by examiner

*Primary Examiner* — Awet Haile

(57) ABSTRACT

In one embodiment, an apparatus includes a plurality of antennas, a plurality of Front End Modules (FEMs) coupled to the antennas, an input for receiving Power over Ethernet (PoE), a PoE detector for identifying a type of PoE received at the apparatus, wherein the type of PoE is associated with a PoE power budget, and a power controller for applying a PoE power conservation policy based on the PoE power budget, wherein applying the PoE power conservation policy comprises switching between a normal operating voltage and a reduced operating voltage at the FEMs. A method is also disclosed herein.

20 Claims, 4 Drawing Sheets

FIGURE 3A

| Power Consumption @ 24dBm U.FL (W) | 2.4 GHz FEM | | | 5 GHz FEM | | |
|---|---|---|---|---|---|---|
| | 4.2V | 5V | Delta | 4.2V | 5V | Delta |
| 1x1 | 1.83 | 2.18 | 0.35 | 1.79 | 2.13 | 0.34 |
| 2x2 | 3.65 | 4.35 | 0.70 | 3.57 | 4.25 | 0.68 |
| 3x3 | 5.48 | 6.53 | 1.04 | 5.36 | 6.38 | 1.02 |
| 4x4 | 7.31 | 8.70 | 1.39 | 7.14 | 8.50 | 1.36 |

FIGURE 3B

| Power Consumption @ 22dBm U.FL (W) | 2.4 GHz FEM | | | 5 GHz FEM | | |
|---|---|---|---|---|---|---|
| | 4.2V | 5V | Delta | 4.2V | 5V | Delta |
| 1x1 | 1.52 | 1.81 | 0.29 | 1.49 | 1.78 | 0.28 |
| 2x2 | 3.03 | 3.61 | 0.58 | 2.98 | 3.55 | 0.57 |
| 3x3 | 4.55 | 5.42 | 0.87 | 4.47 | 5.33 | 0.85 |
| 4x4 | 6.06 | 7.22 | 1.16 | 5.96 | 7.10 | 1.14 |

DYNAMIC ACCESS POINT RADIO FREQUENCY POWER CONTROL FOR POWER OVER ETHERNET ADAPTATION

TECHNICAL FIELD

The present disclosure relates generally to wireless communications systems, and more particularly, to controlling Access Point (AP) Radio Frequency (RF) output power based on AP Power over Ethernet (PoE) budget.

BACKGROUND

Access points are designed to support modes of operation with different system power draws to support various PoE standard budgets. When the power requirements of the AP are not met, the AP may need to reduce or eliminate functions and operate with degraded functionality due to power constraints.

BRIEF DESCRIPTION OF THE DRAWINGS

FIG. 3A is a table illustrating examples of power savings for different access point antenna configurations at a maximum target RF power.

FIG. 3B is a table illustrating examples of power savings for different access point antenna configurations at a reduced target RF power.

Corresponding reference characters indicate corresponding parts throughout the several views of the drawings.

DESCRIPTION OF EXAMPLE EMBODIMENTS

Overview

Figure 1:
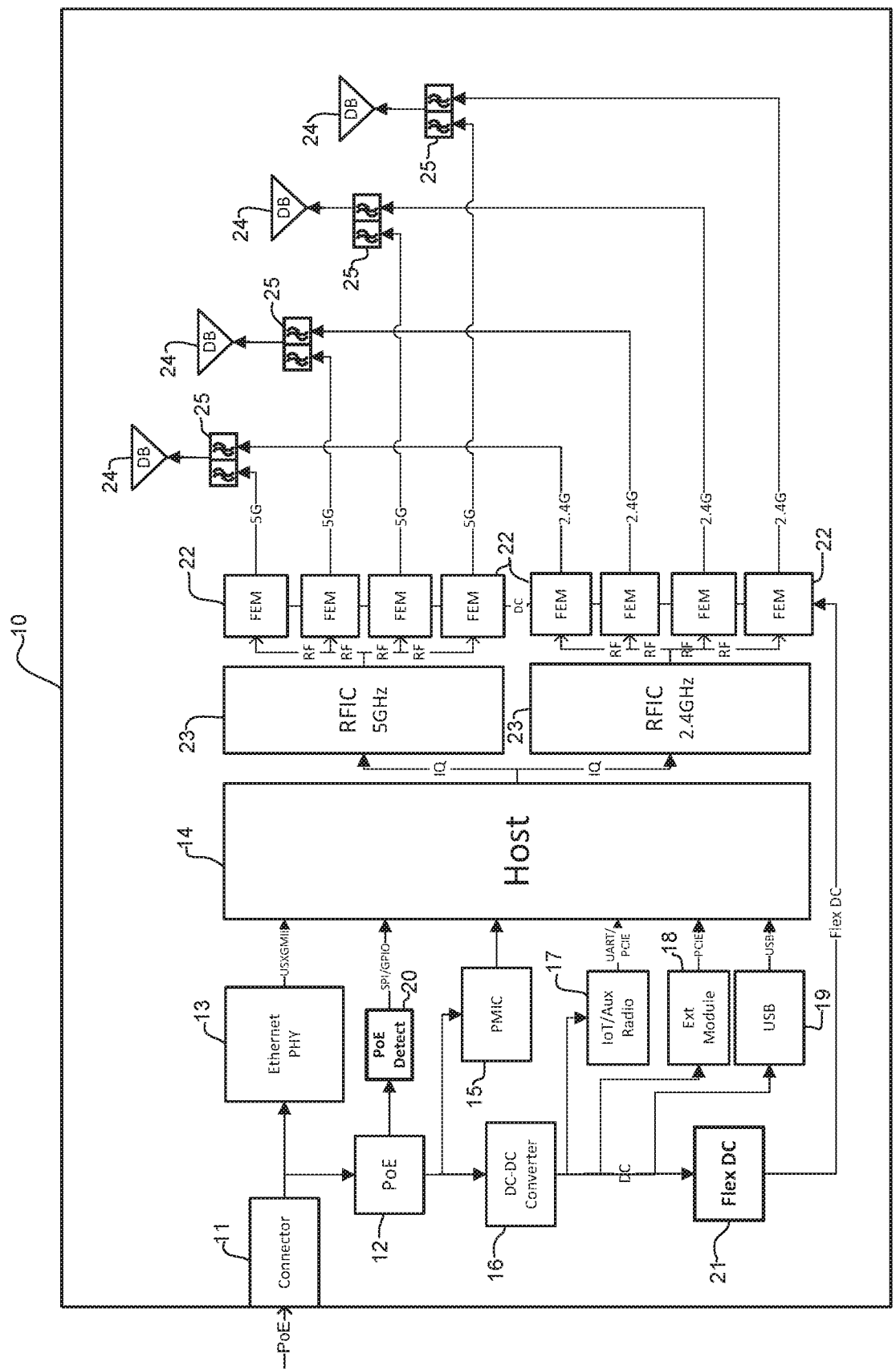
FIG. 1 is a block diagram of an access point, in accordance with one embodiment.

In one embodiment, an apparatus generally comprises a plurality of antennas, a plurality of Front End Modules (FEMs) coupled to the antennas, an input for receiving Power over Ethernet (PoE), a PoE detector for identifying a type of PoE received at the apparatus, wherein the type of PoE is associated with a PoE power budget, and a power controller for applying a PoE power conservation policy based on the PoE power budget. Applying the PoE power conservation policy comprises switching between a normal operating voltage and a reduced operating voltage at the FEMs.

In another embodiment, a method generally comprises receiving PoE at an access point, identifying a type of PoE received at the access point, wherein the type of PoE is associated with a PoE power budget, and applying a PoE power conservation policy based on the PoE power budget. Applying the PoE power conservation policy comprises reducing an operating voltage at FEMs coupled to antennas at the access point.

In yet another embodiment, a method generally comprises receiving PoE at an access point, identifying a type of PoE received at the access point, wherein the type of PoE is associated with a PoE power budget, reducing an operating voltage at FEMs coupled to antennas at the access point based on the PoE power budget, and altering a Radio Frequency (RF) power, wherein altering the RF power comprises maintaining the RF power for lower-order MCS (Modulation and Coding Scheme) and reducing the RF power for higher-order MCS, or reducing the RF power for all MCS.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Access Points (APs), both indoor and outdoor, need to operate within a power budget imposed by a Power over Ethernet (PoE) mode. For example, APs are typically configured to operate with a system power draw of less than 51 W (30.5 W typical consumption of AP at PD), 25.5 W, or 13.8 W to support standard IEEE 802.3bt, IEEE 802.3at, or IEEE 802.3af, respectively. New generation access points include new features, including for example, USB (Universal Serial Bus) peripherals, ports for external modules, CPU (Central Processing Unit) throughput throttling, and other features, which consume more power. When the power requirements of the AP are not met for full functional operation, the AP may disable features in order to operate under the available PoE budget, while not impacting radio performance. However, the disabled features result in a degraded operational mode, without providing flexibility. Other power saving options such as turning off a certain number of TX (transmission) chains have a number of drawbacks. For example, turning off TX chains lowers the number of spatial streams, which may impact features such as MU-MIMO (Multi-User Multiple Input, Multiple Output). Also, lowering TX power by turning off TX chains lowers total power in 3 dB step decrements, which would impact AP cell range.

The embodiments described herein allow an access point to retain certain features, which may otherwise have to be reduced or eliminated due to power constraints. In one or more embodiments, WLAN (Wireless Local Area Network) TX (transmission) RF (Radio Frequency) power may be dynamically lowered or raised based on available PoE power budget. As described below, one or more embodiments dynamically alter the AP RF output power by re-biasing FEMs (Front End Modules)/PAs (Power Amplifiers) based on the AP PoE power budget. One or more embodiments allow for a considerable amount of DC (Direct Current) power to be saved without impact to RF performance (e.g., Linearity/Gain) or AP cell size, or use of higher MCS (Modulation and Coding Scheme) or MIMO (Multiple-Input and Multiple-Output). The saved power may be used to retain any number of AP functions or features, while remaining under the PoE budget imposed by a PoE mode (e.g., IEEE 802.3bt, IEEE 802.3at, IEEE 802.3af, or any other current or future standard with any PoE power budget).

One or more embodiments provide very granular adaption to the available PoE power budget by re-biasing TX chains and providing approaches to trade off linearity and RF output power. In one or more embodiments, the AP may operate select MCS at maximum RF power to avoid degradation of cell size. One or more embodiments provide maximum DC power savings with uniform RF power back-off, Dynamic Antenna Allocation (DAA), and MAC (Media Access Control) scheduling algorithms for maximum throughput retention. In one or more embodiments, flexibility is provided in retaining flagship (priority) features through use of recovered DC power.

Referring now to the drawings and first to FIG. 1, a block diagram of an access point 10 is shown, in accordance with one embodiment. The AP 10 includes a connector (input) 11 (e.g., RJ45 Ethernet connector, MagJack, wired connector port) for receiving PoE on an Ethernet cable coupled to the connector. PoE may be received at the AP 10 from Power Sourcing Equipment (PSE) (e.g., switch or another network device). The AP 10 may operate in different modes based on the power provided by the PoE source, as described below. At the AP 10, the connector 11 is coupled to PoE block 12 and an Ethernet PHY (physical layer) transceiver 13. In this example, the Ethernet PHY transceiver has a USXGMII (Universal Serial Gigabit Media Independent Interface) connection to a host 14. PoE is transmitted to a PMIC (Power Management Integrated Circuit) 15 and one or more DC-DC converters 16. The DC power is transmitted to one or more AP functions, which may include an IoT (Internet of Things)/Aux (Auxiliary) radio 17, external module 18, USB module 19, or any other AP function. In the example shown in FIG. 1, the IoT/Aux radio 17 communicates with the host 14 over a UART (Universal Asynchronous Receiver Transmitter)/PoE interface, the external module 18 communicates with the host 14 over a PCIe (Peripheral Component Interconnect express) interface, and the USB module 19 communicates with the host over a USB interface. It is to be understood that the AP functions and interfaces shown are only examples and the AP 10 may include any number or type of functions or features.

As described in detail below, PoE detect circuitry 20 detects (identifies) the PoE technical generation (e.g., IEEE 802.3bt, 802.3at, 802.3af) and power control circuitry (referred to herein as "Flex DC") 21 applies power conservation policies through control of FEMs (Front End Modules) 22. The FEM integrates multiple devices used to implement the RF front end, including for example, a power amplifier, low noise amplifier, or other components. Thus, reference to the FEM operating voltage as described herein may refer to the operating voltage of the FEM, power amplifier, or other FEM component. The PoE detect circuitry 20 identifies the PoE network and sends a signal to the host 14 over an SPI (Serial Peripheral Interface)/GPIO (General Purpose Input/Output) connection.

In the example shown in FIG. 1, the host 14 is connected to two RFICs (Radio Frequency Integrated Circuits) 23 (e.g., 5 GHz RFIC and 2.4 GHz RFIC) through IQ links. Each RFIC 23 is in communication with four FEMs through RF interfaces. The AP 10 includes four antennas 24, each comprising a diplexer 25 receiving input from two FEMs 22 (one FEM coupled to 5 GHz RFIC and one FEM coupled to the 2.4 GHz RFIC). The AP 10 sends wireless transmissions to client devices and receives wireless transmissions from client devices via its antennas 24.

In one or more embodiments, an apparatus comprises a plurality of the antennas 24, a plurality of the FEMs 22, an input 11 for receiving PoE, the PoE detector 20 for identifying a type of PoE (e.g., IEEE 802.3bt, 802.3at, 802.3af, or other standard) received at the apparatus and associated with a PoE power budget, and a power controller (Flex DC 21, AP controller) for applying a PoE power conservation policy based on the PoE power budget. As described below, the PoE power conservation policy includes switching between a normal operating voltage and a reduced operating voltage at the FEMs (re-biasing the FEMs).

It is to be understood that the AP 10 shown in FIG. 1 is only an example and the AP may include any number or type of components in any suitable arrangement, without departing from the scope of the embodiments. The access point may be any electronic device, such as a network device having wireless and wired networking capabilities.

In conventional systems, front end modules in 2.4/5/6 GHz transmit (TX) chains are typically biased at a fixed voltage (e.g., 5V (volts)) with an average DC power consumption of 1.25-1.75 W (watts), providing RF power of 17-24 dBm (decibel milliwatts) per TX chain. This fixed operating voltage limits flexibility and as previously described, may lead to reduced functionality at the access point. The embodiments described herein provide for modification of the voltage at the FEMs 22, thereby saving DC power without impacting RF performance. In one or more embodiments, the AP RF output power is dynamically modified by re-biasing the FEMs 22 at a different voltage based on the AP PoE budget. Dynamic power throttling is provided through the power control circuit (Flex DC) 21 (FIG. 1). The PoE detect circuitry 20 receives PoE and detects whether the AP is connected to an IEEE 802.3bt, 802.3at, or 802.3af PoE network (or other current or future standard network) and sends a signal to the host 14 so that appropriate PoE power conservation policies may be applied. As shown in FIG. 1, the power control circuit (Flex DC) 21 communicates directly with the FEMs 22.

In a power conservation mode, the DC-DC converter circuit 16 switches between the FEMs nominal (normal) operating voltage (e.g., 5V) and an operational minimum voltage (reduced operating voltage) (e.g., 4.2V), thereby modifying the operating voltage at the FEMs 22 (re-biasing the FEMs/PAs) and providing significant DC power savings. It is to be understood that the 4.2V described herein is only one example of an operational minimum voltage and other voltage levels may be used without departing from the scope of the embodiments. For example, another reduced operating voltage level may be selected, which does not impact RF performance (e.g., linearity/gain), AP cell size, higher MCS operation, or MIMO operation. In one or more embodiments, the lower bias voltage is selected such that the FEMs 22 are stable enough that they will not need different front end matching compared to standard operating conditions. In one or more modes, the re-biasing of the FEMs 22 may result in a downward shift of RF operating point (e.g., 2 dB), which may be accounted for and managed by the AP in its power tables and number of TX chains deployed, as described below.

Figure 2:
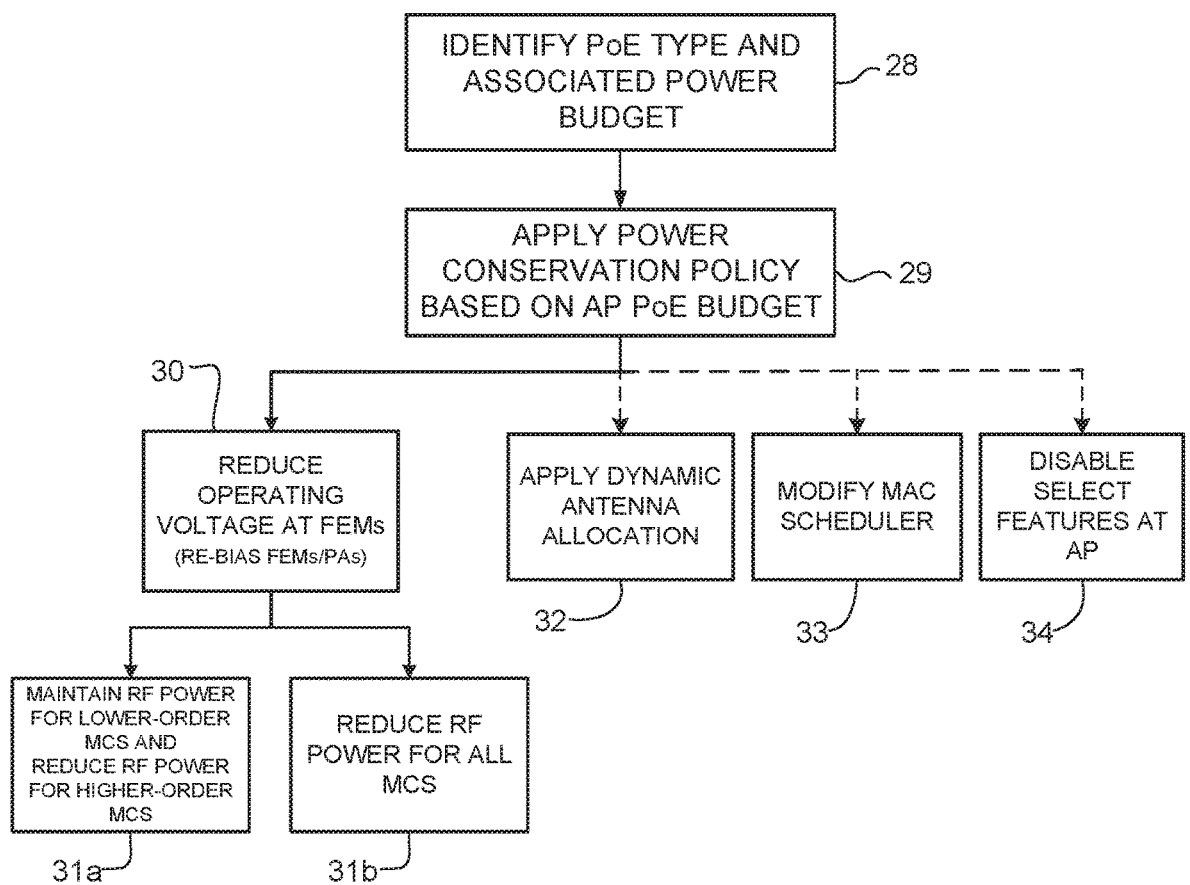
FIG. 2 is a flowchart illustrating an overview of a process for dynamically controlling access point RF (Radio Frequency) power based on an access point PoE (Power over Ethernet) budget, in accordance with one embodiment.

FIG. 2 is a flowchart illustrating an overview of a process for dynamic access point RF power control (throttling) for PoE adaptation, in accordance with one embodiment. The AP 10 receives PoE from a PSE device, as described above with respect to FIG. 1. The AP 10 identifies a type of PoE received at the AP (e.g., detects whether AP is connected to IEEE 802.3bt, 802.3at, or 802.3af network, each associated with a PoE power budget (e.g., 51 W (30.5 W typical consumption of AP at PD), 25.5 W, 13.8 W)) (step 28). This may be performed, for example, at PoE detect circuitry 20 (FIG. 1). The AP 10 applies a PoE power conservation policy based on the AP PoE budget (step 29) using power control circuitry (Flex DC) 21 (FIGS. 1 and 2). Applying the PoE power conservation policy comprises switching between a normal operating voltage and a reduced operating voltage at the FEMs 22 coupled to the antennas 24 at the access point 10 (re-biasing the FEMs/PAs) (step 30). The AP RF output power is dynamically altered by re-biasing the FEMs. In one example, RF power is maintained for lower-order MCS (one or more lower-order MCS) and RF power is reduced for higher-order MCS (one or more higher-order MCS) (step 31*a*). In another example, RF power is reduced for all MCS (e.g., power back-off of 2 dB) (step 31*b*).

The power conservation policy may further include one or more of applying dynamic antenna allocation (step 32), modifying a MAC scheduler (step 33), or disabling one or more AP functions (e.g., USB, external module, auxiliary radio, or any other AP feature) (step 34). As described below, dynamic antenna allocation may be used to select the number of TX chains to keep multicast and management transmissions at the highest RF levels. The MAC scheduler may be modified to remove one or more MCS that is no longer supported. Different policies may be applied for different modes of operation with any combination of steps 30-34 applied. The policies and RF power may be modified as needed to provide dynamic radio transmit RF power throttling.

It is to be understood that the process shown in FIG. 2 is only an example and steps may be added, modified, or combined, without departing from the scope of the embodiments. Also, it should be noted that the PoE power budgets described herein are only examples and other power budgets may be used.

The following provides implementation details of steps 30-33 shown in the flowchart of FIG. 2, in accordance with one or more embodiments.

As noted above with respect to step 30 of FIG. 2, the AP RF output power is dynamically altered by re-biasing the FEMs (reducing operating voltage at FEMs). The re-biasing results in a downward shift of RF operating point, which is accounted for and managed by the AP in its power tables and number of TX chains deployed.

In one example, downward biasing may be performed and the FEMs 22 (FIG. 1) may continue to operate at the maximum RF power (e.g., 24 dBm) for lower-order MCS, thereby maintaining the AP cell size (step 31*a* in FIG. 2). In this mode, the AP power may remain, for example, at 24 dBm per path and radio performance is not impacted. Higher-order MCS TX power levels may be shifted downward as much as 2 dB, for example, to meet Error Vector Magnitude (EVM) requirements. This is accomplished by alteration of power tables allowing wider ranges of FEM/PA linearity. Power may be saved by a reduction in the power table with a change to a lower MCS (e.g., shifting higher-order MCS transmission power levels downward). This technique may save, for example, 2.75 W DC in 4×4 MIMO mode. In this example, maintenance of IEEE TX mask may be a limiting factor for lower MCS (e.g., BPSK (Binary Phase Shift Keying)/QPSK (Quadrature Phase Shift Keying), 16-QAM (Quadrature Amplitude Modulation)) and EVM for higher-order modulation.

In another example, additional DC power may be saved by an overall reduction of the power table (e.g., 2 dB) (step 31*b* in FIG. 2). In this case, all MCS may be reduced the same amount, thereby resulting in a slightly lower cell size. In many deployments, the cell size may already be constrained by RRM (Radio Resource Management) for optimal channel reuse and interference management. Thus, the power back-off from 24 dBm to 22 dBm may not impact performance. This power control technique may save, for example, 5.05 W DC in 4×4 MIMO mode.

In one or more embodiments, RF power back-off is optimized while maintaining linearity to make radios operational at higher MCS (e.g., MCS 10/11-1K QAM).

Dynamic Antenna Allocation (DAA) may also be brought into the adaptation algorithm by selecting the number of TX chains to keep multicast and management transmissions (typically non-beamformed, non-MIMO) at the highest RF levels (step 32 of FIG. 2).

The MAC scheduler may also be adapted with a different throughput cost function for selection of MIMO modes and MCS (step 33 of FIG. 2). Packets are typically sent to clients at highest MCS and then converged to lower MCS based on client capability. The AP may downshift based on retries since it knows what MCS and number of spatial streams it has available for the client. With implementation of the downward bias of FEMs described herein, linearity may decrease and highest order MCS may no longer be valid. For example, using the fact that there is a limitation based on the power saving scheme with the downward bias in terms of DC power, the highest MCS may no longer be valid. In one or more embodiments, the MAC scheduler may remove MCS that are no longer capable of being supported so that the AP quickly converges to the client state.

FIGS. 3A and 3B are tables illustrating examples of power savings for 2.4 GHz and 5 GHz FEMs for 1×1, 2×2, 3×3, and 4×4 operation with power consumption at 24 dBm and 22 dBM. The tables show power consumption at 4.2V and 5V for 2.4 GHz FEM and 5 GHz FEM and a delta (power saving) for each mode of operation.

In the example shown in FIG. 3A, a power savings of 2.75 W was achieved for 2.4 GHz and 5 GHz FEMs with Tx/Rx for 4×4 and a target RF power of 24 dBm (1.39 W delta at 2.4 GHz FEMs+1.36 W delta at 5 GHz FEMs).

In the example shown in FIG. 3B, a power savings of 2.3 W was achieved for 2.4 GHz and 5 GHz FEMs with Tx/Rx for 4×4 and a target RF power of 22 dBm (2 dB power back-off) (1.16 W delta at 2.4 GHz FEMs.+1.14 W delta at 5 GHz FEMs). In this example, the operating voltage at the FEMs was reduced from 5V to 4.2V and the target RF output power was reduced from 24 dBm to 22 dBm, resulting in a power savings of 5.05 W (2.75 W+2.3 W).

It should be noted that the power consumption values shown in the tables of FIGS. 3A and 3B are examples for specific FEM implementations and are provided only to show an example of power savings that may be achieved with the embodiments described herein. Different AP configurations with different FEMs, antennas, components, or operating modes may have different power savings.

The following provides examples of PoE power policies, in accordance with one or more embodiments.

In a first mode, the AP detects IEEE 802.3bt PoE at PoE detect circuitry 20 (FIG. 1). The power controller (Flex DC) 21 biases the FEMs 22 at a standard operating voltage (e.g., 5V) with an output RF power of 24 dBm/Tx chain (maximum).

In a second mode, the AP detects IEEE 802.3bt PoE and the power controller 21 re-biases the FEMs 22 to a lower voltage level (e.g., 4.2V) to save power. The saved power is redirected to maintain AP flagship features (e.g., auxiliary radio, USB module, external module, etc.).

In a third mode, the AP detects IEEE 802.3at PoE. The power controller 21 re-biases the FEMs 22 to a lower voltage level (e.g., 4.2V) to save power. Select AP features may be disabled as needed.

In a fourth mode, the AP detects IEEE 802.3af PoE. The AP shuts down one or more secondary features (e.g., USB (4.5 W), external modules (9 W), etc.) while keeping primary functions (e.g., radios serving clients) operational. The power controller 21 re-biases the FEMs 22 to save additional power (e.g., 5 W).

In a fifth mode (referred to herein as Flex Mode), AP PoE policy and user specified options determine an optimized combination of modes and features. In one example, the AP may be configured with a default PoE policy that a user may modify. The user may, for example, access a controller page (Graphical User Interface (GUI)) to select features to turn on or off. In one example, when the power requirements of the AP are not met after altering the RF power, the AP may disable a user defined function.

It is to be understood that the operating modes described above are only examples of implementation of power conservation policies and the access point may operate in any number of modes, with each mode using any combination of power saving techniques described herein.

Figure 4:
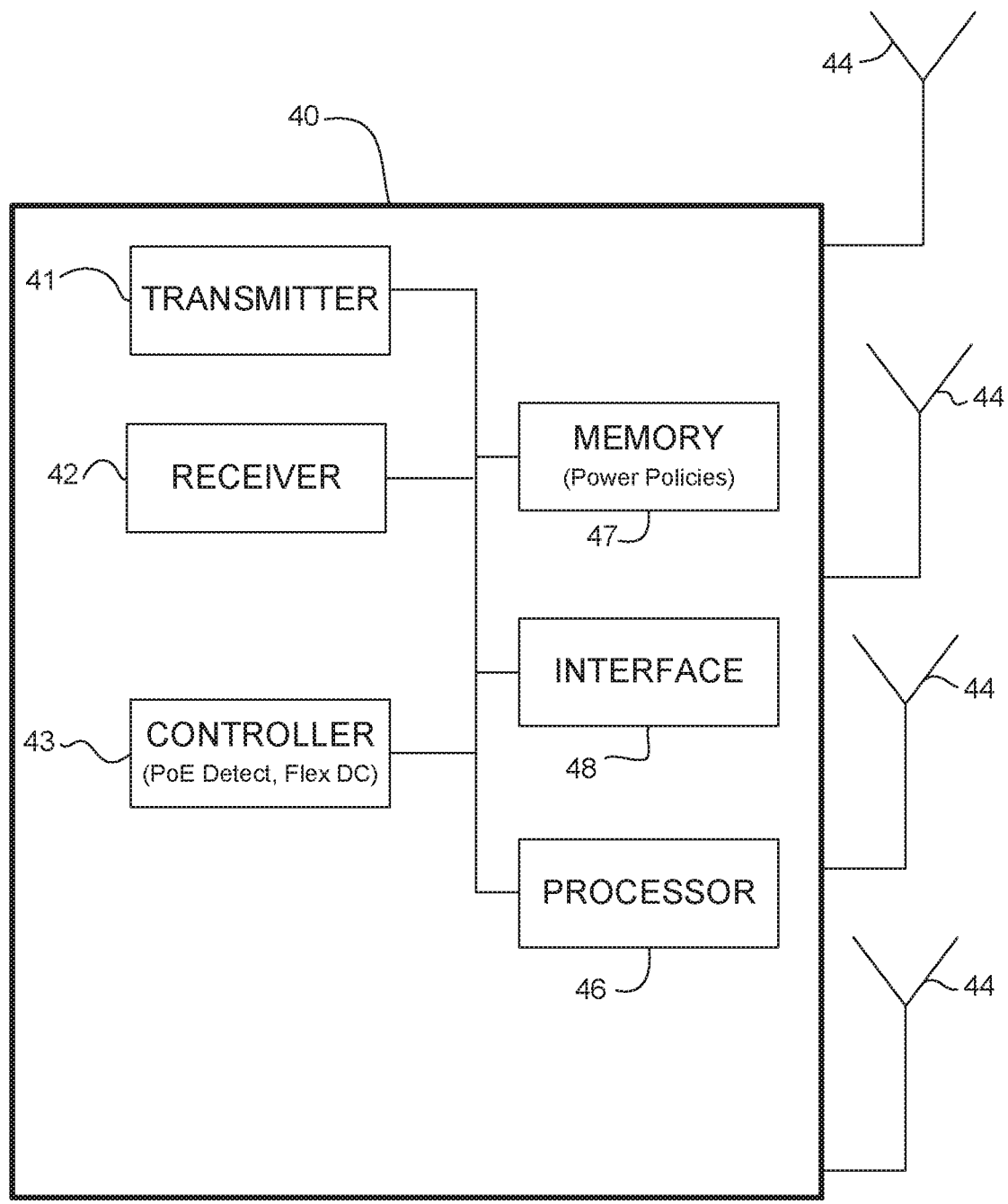
FIG. 4 is a simplified block diagram depicting an example of a network device in which the embodiments described herein may be implemented.

FIG. 4 is a block diagram illustrating a simplified example of a network device 40 (e.g., access point) that may be used to implement embodiments described herein. In one embodiment, the network device 40 is a programmable machine that may be implemented in hardware, software, or any combination thereof. The device 40 includes a transmitter 41, receiver 42, controller 43, processor 46, memory 47, interface 48 (e.g., PoE interface), and antennas 44. Each of the components may interact with one another through any suitable connection. The device 40 may include communications components, including for example, a 2.4 GHz radio, 5 GHz radio, or radio operating at any other frequency supporting MIMO transmit chain capabilities, as described above with respect to FIG. 1.

The terms transmitter and receiver as used herein may also refer to a transceiver. The transmitter block 41 includes a plurality of RF transmitters and the receiver block 42 includes a plurality of RF receivers, each associated with one of the antennas 44.

The controller (control system) 43 may include various hardware, firmware, and software components used to control the AP 40. For example, the control system 43 may include logic to implement embodiments described herein. The logic may be encoded in one or more tangible media for execution by the processor 46. For example, the processor 46 may execute codes stored in a computer-readable medium such as memory 47. In one or more embodiments, logic may be encoded on one or more non-transitory computer readable media for execution and when executed operable to perform the steps described above with respect to FIG. 2. The logic may be in the form of software executed by the processor, digital signal processor instructions, or in the form of fixed logic in an integrated circuit, for example. The controller 43 may include the power controller (Flex DC) (e.g., circuit, component, device, element, software). The device may be configured to implement modulation and framing of signals according to an applicable communication protocol or standard under control of the controller 43.

Memory 47 may be a volatile memory or non-volatile storage, which stores various applications, operating systems, modules, and data for execution and use by the processor 46. Memory 47 may include multiple memory components. Data relating to operations described herein may be stored within any suitable data structure and transmitted in any suitable format. Power conservation policies may be stored in memory 47 and may include, for example, predefined PoE profiles, user defined profiles, priority order of functions, PoE mode power budget, power tables, or any other data. In one or more embodiments, a PoE profile may be stored at a WLAN controller and pushed to an AP when the AP joins the WLAN controller. A default PoE profile may also be stored at the AP.

The interface 48 may include any number of wireless or wired interfaces (e.g., one or more wired or wireless network interface cards and components). For example, the AP 40 may include a network interface for communication with a WLAN. The interface 48 may also include a USB interface or external module interface, for example. A user interface (e.g., GUI, command-line, prompt, etc.) may be provided for obtaining information (e.g., policy preferences).

It is to be understood that the network device 40 shown in FIG. 4 and described above is only an example and that different configurations of network devices may be used. For example, the network device 40 may further include any suitable combination of hardware, software, algorithms, processors, devices, components, or elements operable to facilitate the capabilities described herein.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. An apparatus comprising:
a plurality of antennas;
a plurality of Front End Modules (FEMs) coupled to the antennas;
an input for receiving Power over Ethernet (PoE);
a PoE detector for identifying a type of PoE received at the apparatus, wherein said type of PoE is associated with a PoE power budget; and
a power controller for applying a PoE power conservation policy based on said PoE power budget;
wherein applying said PoE power conservation policy comprises switching between a normal operating voltage and a reduced operating voltage at the FEMs, wherein the reduced operating voltage continues to apply power to the FEMs.

2. The apparatus of claim 1 wherein applying said PoE power conservation policy further comprises reducing a Radio Frequency (RF) power for all MCS (Modulation and Coding Scheme).

3. The apparatus of claim 1 wherein the FEMs are configured to operate at a maximum RF power for a lower-order MCS (Modulation and Coding Scheme) at the reduced operating voltage to maintain an access point cell size.

4. The apparatus of claim 3 wherein a higher-order MCS (Modulation and Coding Scheme) transmission power level is shifted downward.

5. The apparatus of claim 1 wherein applying said PoE power conservation policy further comprises implementing a dynamic antenna allocation to select a number of transmission chains to maintain multicast and management transmissions at a high Radio Frequency (RF) level.

6. The apparatus of claim 1 wherein applying said PoE power conservation policy further comprises modifying a MAC (Media Access Control) scheduler to remove an MCS (Modulation and Coding Scheme) that is not supported.

7. The apparatus of claim 1 wherein applying said PoE power conservation policy further comprises disabling an access point function at the apparatus.

8. The apparatus of claim 7 wherein disabling an access point function comprises disabling one or more of a USB (Universal Serial Bus) module, an external module, or an auxiliary radio.

9. The apparatus of claim 1 wherein the plurality of antennas are configured for 4×4 MIMO (Multiple-Input and Multiple-Output) operation.

10. A method comprising:
receiving Power over Ethernet (PoE) at an access point;
identifying a type of PoE received at the access point, wherein said type of PoE is associated with a PoE power budget; and
applying a PoE power conservation policy based on said PoE power budget;
wherein applying said PoE power conservation policy comprises reducing an operating voltage to a reduced operating voltage at Front End Modules (FEMs) coupled to antennas at the access point, wherein the reduced operating voltage continues to apply power to the FEMs.

11. The method of claim 10 wherein applying said PoE power conservation policy further comprises reducing a Radio Frequency (RF) power for all MCS (Modulation and Coding Scheme).

12. The method of claim 10 wherein the FEMs continue to operate at a maximum RF power for a lower-order MCS (Modulation and Coding Scheme) at the reduced operating voltage to maintain an access point cell size.

13. The method of claim 12 wherein a higher-order MCS (Modulation and Coding Scheme) transmission power level is shifted downward.

14. The method of claim 10 wherein applying said PoE power conservation policy further comprises implementing a dynamic antenna allocation to select a number of transmission chains to keep multicast or management transmissions at a high Radio Frequency (RF) level.

15. The method of claim 10 wherein applying said PoE power conservation policy further comprises modifying a MAC (Media Access Control) scheduler to remove an MCS (Modulation and Coding Scheme) that is not supported.

16. The method of claim 10 wherein applying said PoE power conservation policy further comprises disabling a function at the access point.

17. The method of claim 16 wherein disabling a function comprises disabling a user defined function.

18. A method comprising:
receiving Power over Ethernet (PoE) at an access point;
identifying a type of PoE received at the access point, wherein said type of PoE is associated with a PoE power budget;
reducing an operating voltage to a reduced operating voltage at Front End Modules (FEMs) coupled to antennas at the access point based on the PoE power budget, wherein the reduced operating voltage continues to apply power to the FEMs; and
altering a Radio Frequency (RF) power, wherein altering the RF power comprises:
maintaining the RF power for a lower-order MCS (Modulation and Coding Scheme) and reducing the RF power for a higher-order MCS; or
reducing the RF power for all of the MCS.

19. The method of claim 18 further comprising implementing a dynamic antenna allocation to select a number of transmission chains to keep multicast or management transmissions at a high RF level.

20. The method of claim 18 further comprising modifying a MAC (Media Access Control) scheduler to remove an MCS that is not supported.

* * * * *